(12) United States Patent
Camp et al.

(10) Patent No.: US 7,803,034 B2
(45) Date of Patent: Sep. 28, 2010

(54) SYSTEM FOR MOVING AND POSITIONING AN OBJECT SUCH AS A TOOL

(75) Inventors: Edward C. Camp, Princeton, MA (US); Craig Gardner, West Boylston, MA (US)

(73) Assignee: Positioning Systems, Inc., Worcester, MA (US)

( * ) Notice: Subject to any disclaimer, the term of this patent is extended or adjusted under 35 U.S.C. 154(b) by 185 days.

(21) Appl. No.: 11/692,833

(22) Filed: Mar. 28, 2007

(65) Prior Publication Data

US 2007/0232196 A1 Oct. 4, 2007

Related U.S. Application Data

(60) Provisional application No. 60/744,025, filed on Mar. 31, 2006.

(51) Int. Cl.
*B24B 41/00* (2006.01)
(52) U.S. Cl. ............... 451/5; 451/11; 451/135
(58) Field of Classification Search ............... 451/5, 451/11, 135, 211
See application file for complete search history.

(56) References Cited

U.S. PATENT DOCUMENTS

| | | | |
|---|---|---|---|
| 4,014,439 A * | 3/1977 | Kochsiek et al. ............... 82/142 |
| 4,096,667 A | 6/1978 | Uhtenwoldt et al. |
| 5,197,836 A * | 3/1993 | Crivellin ..................... 409/200 |
| 5,274,960 A | 1/1994 | Karlsrud |
| 5,396,821 A * | 3/1995 | Okumura et al. ............... 82/1.3 |
| 5,466,085 A | 11/1995 | Sheldon et al. |
| 5,616,070 A | 4/1997 | Rice et al. |
| 5,664,308 A | 9/1997 | Dietert |
| 6,158,311 A * | 12/2000 | Watkins et al. ................ 82/1.4 |
| 6,219,918 B1 | 4/2001 | Wieland |
| 6,533,508 B1 * | 3/2003 | Nonaka ..................... 409/132 |
| 6,600,250 B1 * | 7/2003 | Fedeli ....................... 409/191 |
| 7,074,360 B2 * | 7/2006 | Wolven ....................... 266/46 |
| 2004/0029500 A1 | 2/2004 | Saitoh et al. |
| 2006/0040586 A1 | 2/2006 | Arai |

* cited by examiner

*Primary Examiner*—Maurina Rachuba
(74) *Attorney, Agent, or Firm*—Brian M. Dingman; Mirick, O'Connell, DeMallie & Lougee, LLP

(57) ABSTRACT

A system for moving and positioning an object such as a tool. The system has a first assembly that has a first rotatable portion that is rotatable about a first axis, and a second assembly that has a second rotatable portion that is rotatable about a second axis that is not coincident with the first axis. The system may include a third assembly that has a third rotatable portion that is rotatable about a third axis that is not coincident with the second axis. The assemblies are coupled such that rotation of the first rotatable portion causes eccentric rotation of the second and third rotatable portions about the first axis. The system also includes a controller for causing one, two or all three of the rotatable portions to rotate, so as to establish a desired position of an object that is coupled to the system.

20 Claims, 14 Drawing Sheets

SYSTEM FOR MOVING AND POSITIONING AN OBJECT SUCH AS A TOOL

CROSS REFERENCE TO RELATED APPLICATION

This application claims priority of Provisional Patent Application Ser. No. 60/744,025 filed Mar. 31, 2006, the disclosure of which is incorporated herein by reference.

FIELD OF THE INVENTION

The invention relates to a system that uses eccentric rotary motions to move and position an object such as a tool.

BACKGROUND OF THE INVENTION

There are innumerable situations in which it is necessary to automatically properly position an object in two or three dimensions. This need is common in the industrial world, in which machines are used to move objects in a reliable, repeatable manner. One example described in more detail below is the grinding of bearing races. Millions of bearing races are ground each year, using very carefully controlled grinding machines. Such machines need to move the grinding tool into and out of the grinding location (termed the "Z" direction), and toward and away from the bearing race (termed the "X" direction). They must also control the angular position of the grinding wheel relative to the race.

Bearing grinding machines commonly accomplish Z and X-axis motion with a pair of orthogonally-oriented precision slide mechanisms. These mechanisms are large, heavy and expensive to manufacture and repair. As a consequence, there is the need for reliable, repeatable, precision and less expensive devices that accomplish two or three-axis motion of an object that can be coupled to the device.

SUMMARY OF THE INVENTION

This invention features a system for moving and positioning an object such as a tool. The inventive system accomplishes two or more relative rotary motions, in which at least two of the rotations are eccentric to one another (i.e. the axes of rotation are not coincident). The rotations can be accomplished using any appropriate mechanism that allows rotary motion, such as a bearing or a rotary slide mechanism, for example. An object directly or indirectly coupled to the inventive system can be positioned by proper control of the rotations. The object may be a tool such as machine tool, for example a grinding tool. A system that defines two such rotations is able to position in a plane an object that is coupled to the system. A system that defines three or more rotations can accomplish two motions in a plane, and rotation of the object about an axis that is perpendicular to the plane of motion.

In one specific aspect of the invention, a two-rotation system can accomplish motion in two orthogonal axes within a plane of motion in which the object lies; the plane of motion is perpendicular to the parallel axes of rotation about which the rotations take place; the angular orientation of the object about an axis perpendicular to the plane of its motion is a function of its location in the plane. This aspect of the invention thus can take the place of two orthogonally-oriented linear slide mechanisms. In this aspect of the invention, a third rotation can be included to provide for angular positioning of the object about an axis that is perpendicular to the plane of its motion.

This invention features a system for moving and positioning an object. A first assembly comprises a first rotatable portion that is rotatable about a first axis, and a second assembly comprises a second rotatable portion that is rotatable about a second axis that is not coincident with the first axis. The assemblies are coupled such that rotation of the first rotatable portion causes eccentric rotation of the second rotatable portion about the first axis. A system controller causes one or both of the first and second rotatable portions to rotate, so as to establish a desired position of an object that is directly or indirectly coupled to the system.

The assemblies preferably each comprise bearings. The first assembly may comprise a first bearing having a first diameter, and the second assembly may comprise a second bearing that has a second diameter. The first and second bearings have inner and outer races. The inner race of the second bearing may be adapted to rotate about the second axis. The second axis may or may not pass through the area within the circumference of the inner race of the first bearing. The outer race of the second bearing may be adapted to rotate about the second axis. The second axis may or may not pass through the area within the circumference of the outer race of the first bearing.

The second assembly is preferably coupled to the first rotatable portion of the first assembly. The controller may cause rotation of the first and second rotatable portions so as to produce generally linear movement of the object. The first and second axes are typically essentially parallel. The rotations about the first and second axes are typically both circular rotations.

The first and second assemblies may each comprise a motor. The first and second assemblies may each further comprise a gear reducer or increaser. The motors define output shafts, and the system may further comprise rotary encoders for detecting rotary motion of the motor drive output shafts.

The system preferably further comprises a third assembly comprising a third rotatable portion that is rotatable about a third axis that is not coincident with the second axis. The first, second and third axes may be essentially parallel. The second assembly is preferably coupled to the first rotatable portion of the first assembly, and the third assembly is preferably coupled to the second rotatable portion of the second assembly. The object to be moved by the system may be directly or indirectly coupled to the third assembly.

BRIEF DESCRIPTION OF THE DRAWINGS

Other objects, features and advantages will occur to those skilled in the art from the following description of the preferred embodiments of the invention, and the accompanying drawings, in which.

DETAILED DESCRIPTION OF PREFERRED EMBODIMENTS OF THE INVENTION

This invention may be accomplished in a system for moving and positioning an object. A first assembly comprises a first rotatable portion that is rotatable about a first axis, and a second assembly comprises a second rotatable portion that is rotatable about a second axis that is not coincident with the first axis. The assemblies are coupled such that rotation of the first rotatable portion causes eccentric rotation of the second rotatable portion about the first axis. A system controller causes one or both of the first and second rotatable portions to rotate, so as to establish a desired position of an object that is directly or indirectly coupled to second assembly of the system.

The enclosed figures schematically depict the concept and several two and three-dimensional motion object positioning systems according to the invention.

Figure 1:
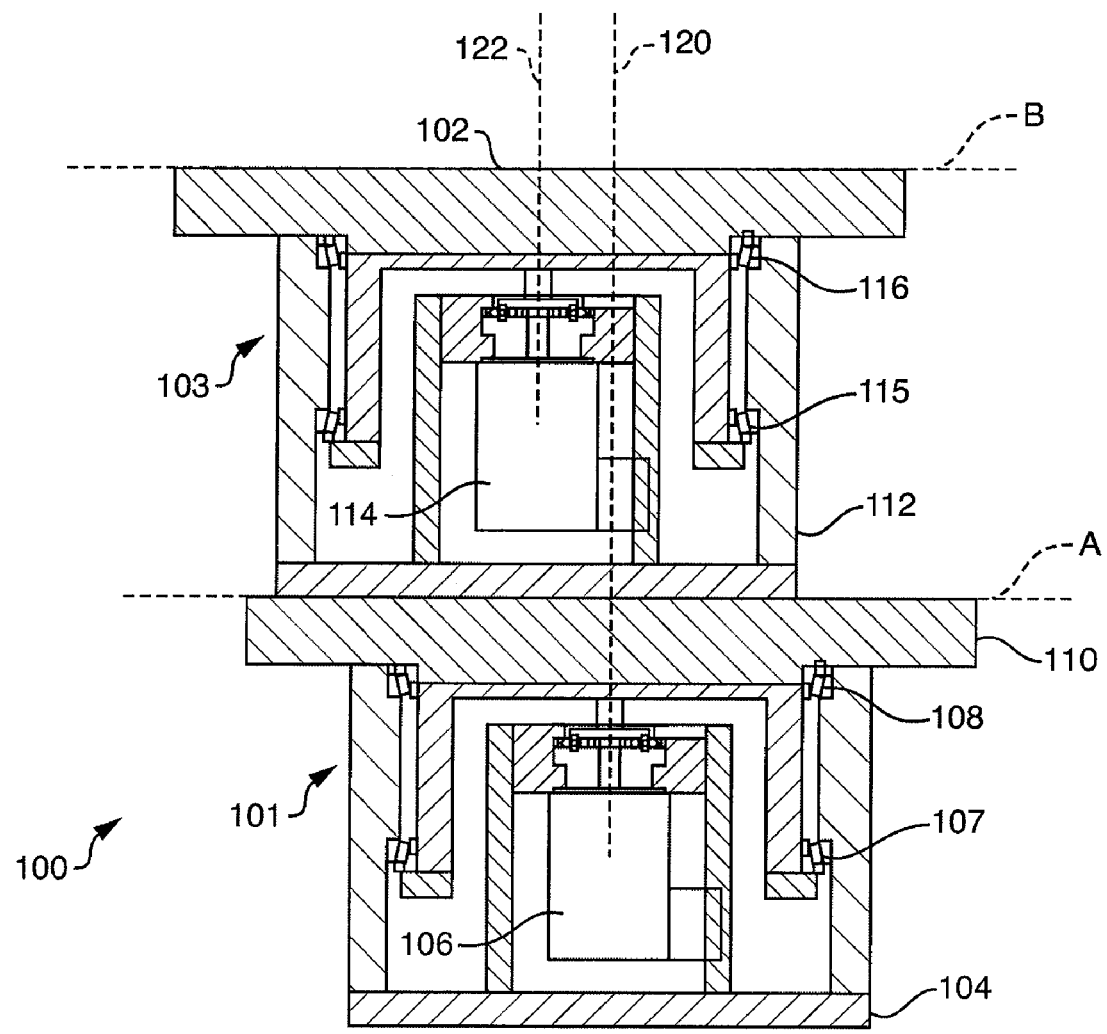
FIG. 1 is a cross-sectional view of a two-rotation system according to the invention that is useful to illustrate one concept of the invention.

FIG. 1 is a cross-sectional view of a two-rotation system according to the invention that is useful to illustrate one concept of the invention. System 100 comprises two coupled rotary motion assemblies 101 and 103. Assemblies 101 and 103 may or may not be identical to one another. Assembly 103 is coupled to rotated member 110 of assembly 101, so that assembly 103 is rotated about axis 120 by assembly 101. Assembly 101 comprises fixed member 104, and rotatable member 110 that is rotated by motor 106 (or another rotary motive device such as a hydraulic actuator that accomplishes rotary motion) about axis 120. Bearings 107 and 108 provide for such rotary motion. Rotation of member 110 thus causes eccentric motion of assembly 103 about axis 120. Rotatable member 102 of assembly 103 is itself rotatable about axis 122 relative to case 112 by motor 114 and bearings 115 and 116. The two rotary motions in parallel planes (plane A of assembly 101 and plane B of assembly 103) accomplishes two-axis motion of member 102 in plane B of member 102. Any object that is directly or indirectly coupled to member 102 and is not coincident with axis 122 is thus positionable in the plane of motion of the object, which in this case would be parallel to plane B. The motion of the device can follow any straight line or curvilinear path in this plane through proper control of the rotations of motors 106 and 114.

Figure 2:
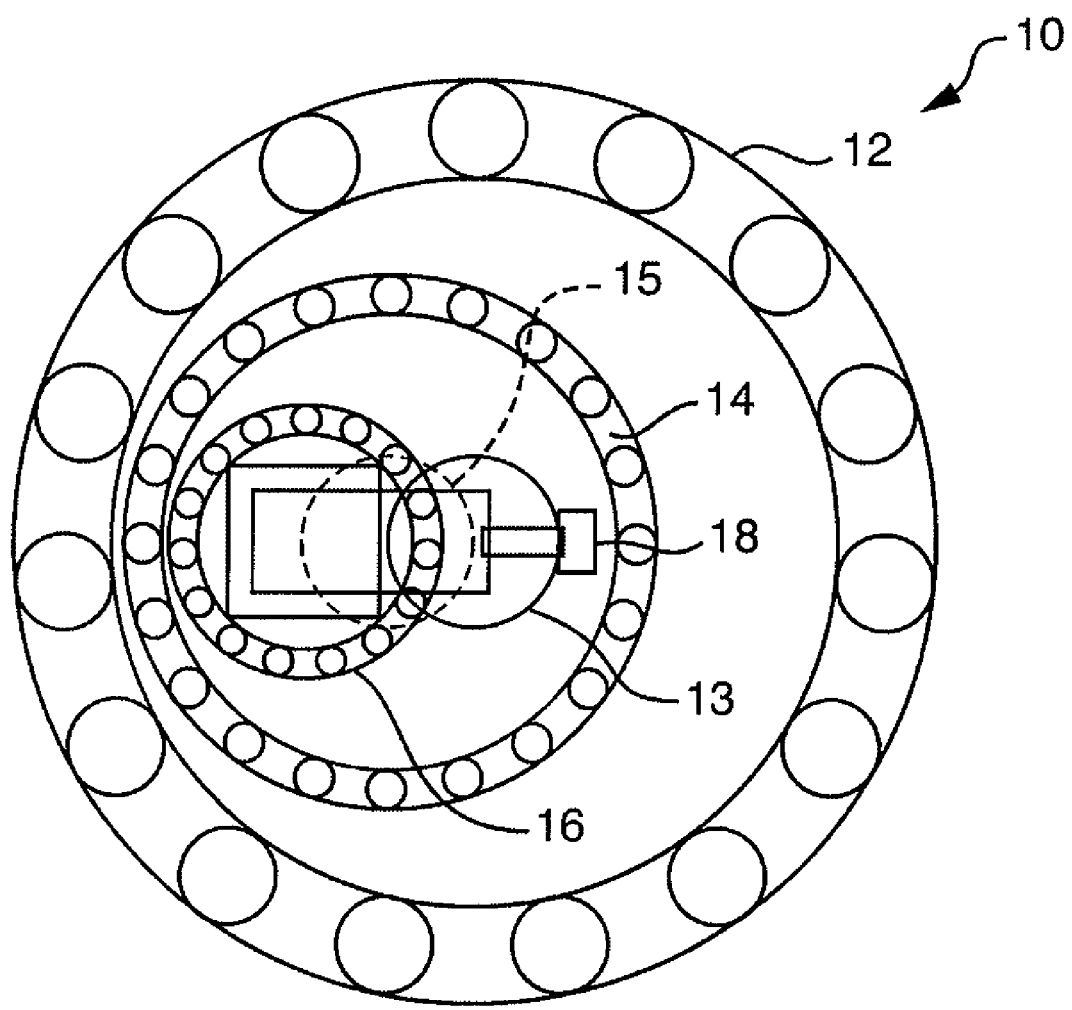
FIG. 2 is a simplified top view of the bearings of a three-rotation system according to the invention.

FIG. 2 is a top view of three bearings of a three-rotation system 10 for positioning object 18 (in this case, a grinding wheel). System 10 is modeled as three nested bearings that are coupled as described below. Largest bearing 12 encompasses mid-size bearing 14 and smallest bearing 16. The bearings are eccentrically mounted such that they each can rotate about a different but parallel axis; in some cases, as the rotations take place these axes may become temporarily coincidental. The bearings are supported such that when the inner race of bearing 12 is rotated, bearings 14 and 16 (and any structures or objects supported by such bearings) are also moved about the axis of rotation of bearing 12. Similarly, when the inner race of bearing 14 is rotated, bearing 16 (and any structures or objects supported by bearing 16) move as well. Object to be positioned 18 is directly or indirectly coupled to the inner race of inner bearing 16. Solid circle 13 shows the path of the center of bearing 14 when bearing 12 is rotated. Dashed circle 15 shows the path of the center of bearing 16 when bearing 14 is rotated. Bearings 12 and/or 14 control the motion of tool 18 in the X-Z plane of its motion, which is parallel to the drawing page. Tool 18 is coupled to bearing 16 such that the tool is rotated about the axis of rotation of bearing 16. Bearing 16 thus controls the angular orientation (theta) of tool 18 in this plane. As is evident from this drawing, bearing 16 has an effect on the X and Z position as well as the angular orientation.

Figure 3A:
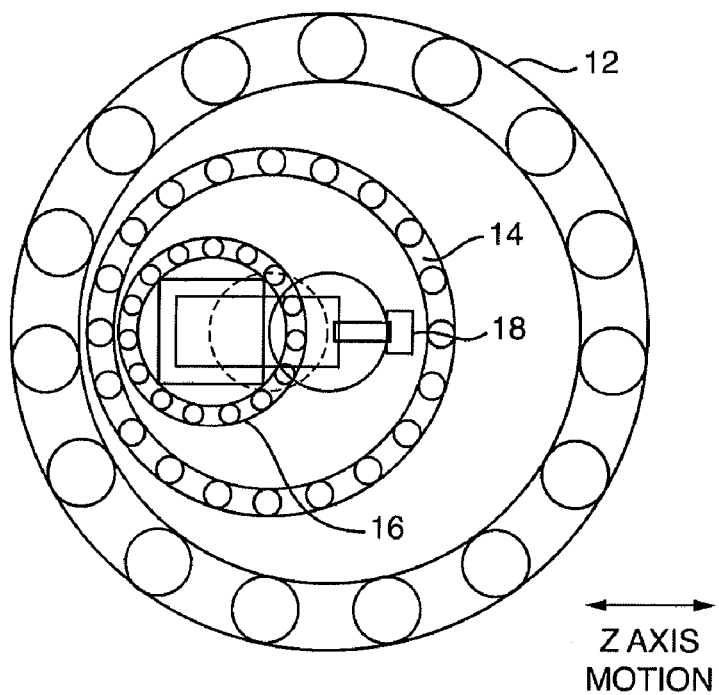
FIGS. 3A and 3B illustrate one specific example of the direction and extent in degrees of rotary motion of the three bearings of a system of the invention that can move an object about fourteen inches in a generally straight line, from the position shown in FIG. 3A to the position shown in FIG. 3B.
Figure 3B:
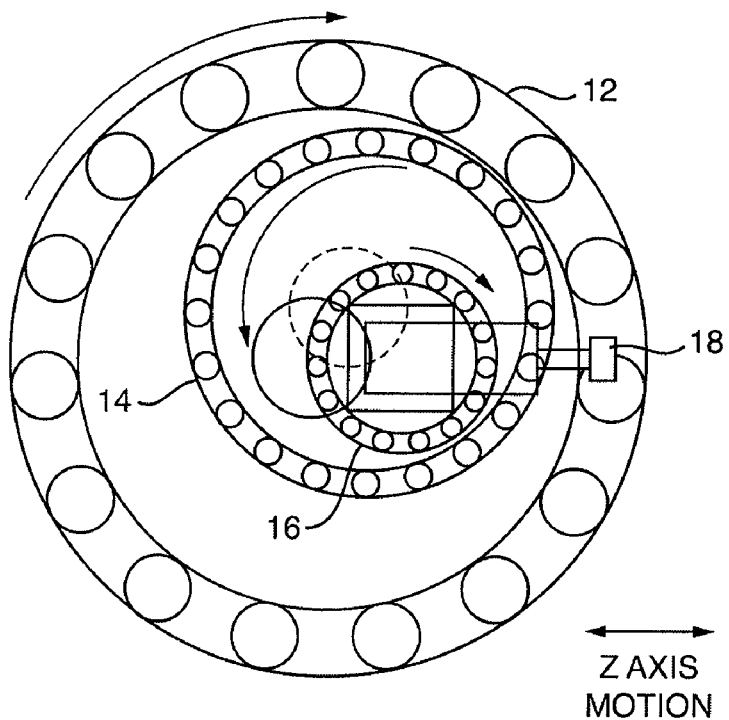

FIGS. 3A and 3B illustrate one specific example of the direction and extent in degrees of rotary motion of bearings 12, 14 and 16 that move object 18, 13.963 inches in a generally straight line along the "Z" axis, from the start position shown in FIG. 3A to the end position shown in FIG. 3B. Bearing 12 has an OD of 43 inches and an ID of 33.75 inches. Bearing 14 has an OD of 25 inches and an ID of 21.25 inches. Bearing 16 has an OD of 12.75 inches and an ID of 10 inches. The motions consist of clockwise motion of large bearing 12 amounting to 138.7 degrees, counterclockwise motion of mid-size bearing 14 of 277.2 degrees, and clockwise motion of smallest bearing 16 of 138.5 degrees. Tool 18 has the same angular orientation at the start and end of this motion, as shown in the drawing. The motions can take place simultaneously or sequentially. The motions are controlled appropriately by the system controller. In situations in which the path of motion is important, straight-line or other purposeful, directed object motion can be accomplished.

Figure 4A:
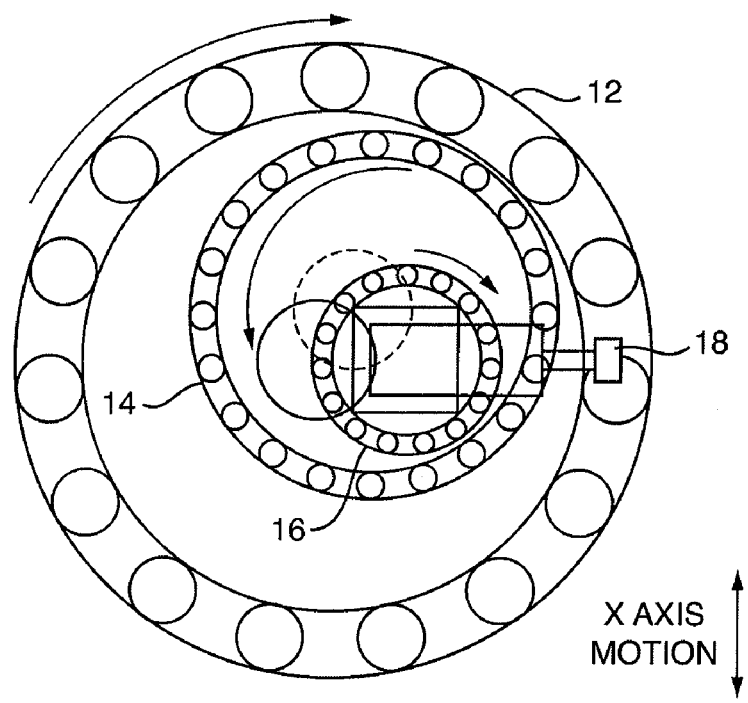
FIGS. 4A and 4B illustrate the motions of the system shown in FIGS. 3A and 3B that can move the object from the position shown in FIG. 4A (which is the same as that shown in FIG. 3B), down on the page about three inches in the "X" direction.
Figure 4B:
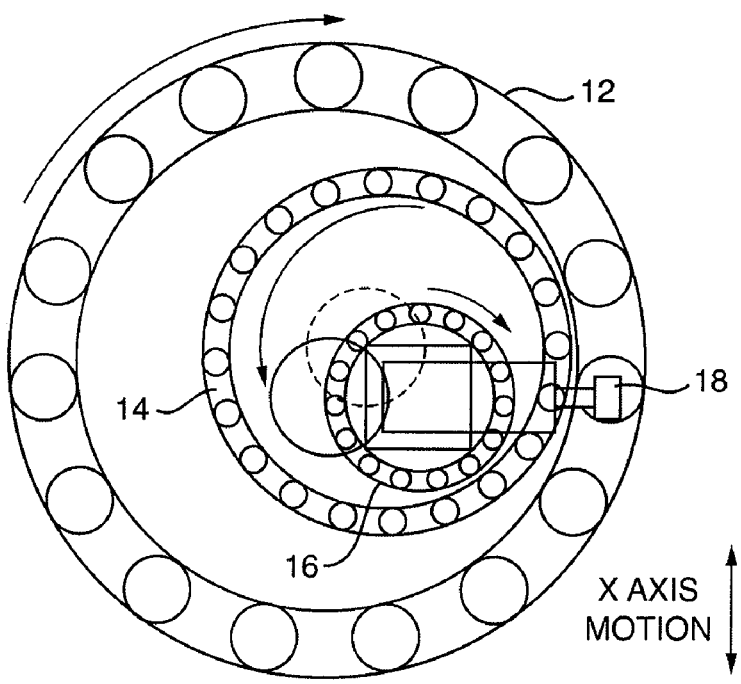

FIGS. 4A and 4B illustrate the motions that move object 18 from the start position shown in FIG. 3A to the position shown in FIG. 4A (which is the same as that shown in FIG. 3B), and also down on the page 2.88 inches in the "X" direction. In order to maintain single axis linear motion, the overall positioning would take place in two steps—the Z axis motion shown in FIGS. 3A and 3B, and then the X axis motion shown in FIGS. 4A and 4B, in either order. The total (absolute) rotational motion of the inner races of bearings 12, 14 and 16, respectively, are: clockwise 173.5 degrees, counterclockwise 294 degrees, and clockwise 120.4 degrees. Straight-line motion is not a constraint of the inventive system, as other motion paths can be accomplished by proper control of the two or more relative rotations.

Figure 5A:
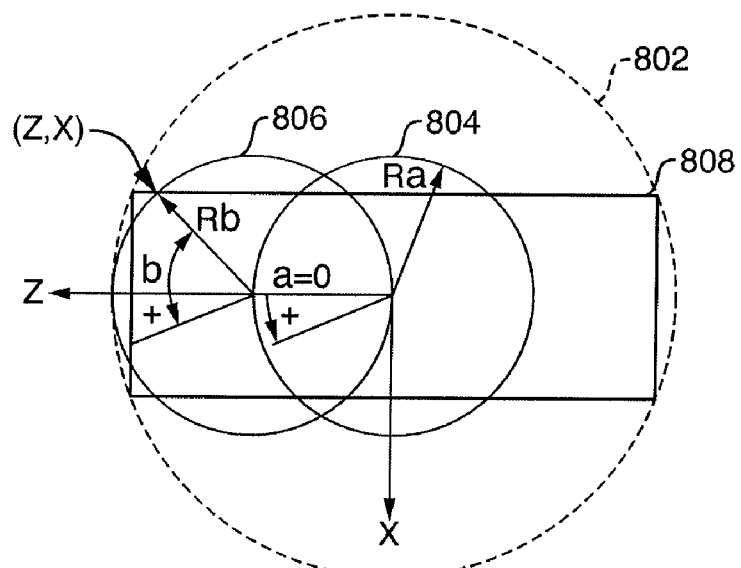
FIGS. 5A and 5B illustrate variables associated with equations that describe the motion of an inventive system with three rotary motions, including two eccentric motions.

Presented below are sets of equations that describe the motion of an object coupled to the inventive system. Equation set 1 describes one means of determining the Z and X axis position in the plane of motion, as well as the angle in the plane required to keep the angular orientation parallel to the Z axis, of the object that is coupled to and being moved by the inventive system assuming the object is located at the center of the bearing "c" (bearing 16, FIGS. 2, 3A, 3B, 4A and 4B). The variables are illustrated in FIG. 5A. This operation might be conducted on system power-up, in order to determine the current position of the object.

Figure 5B:
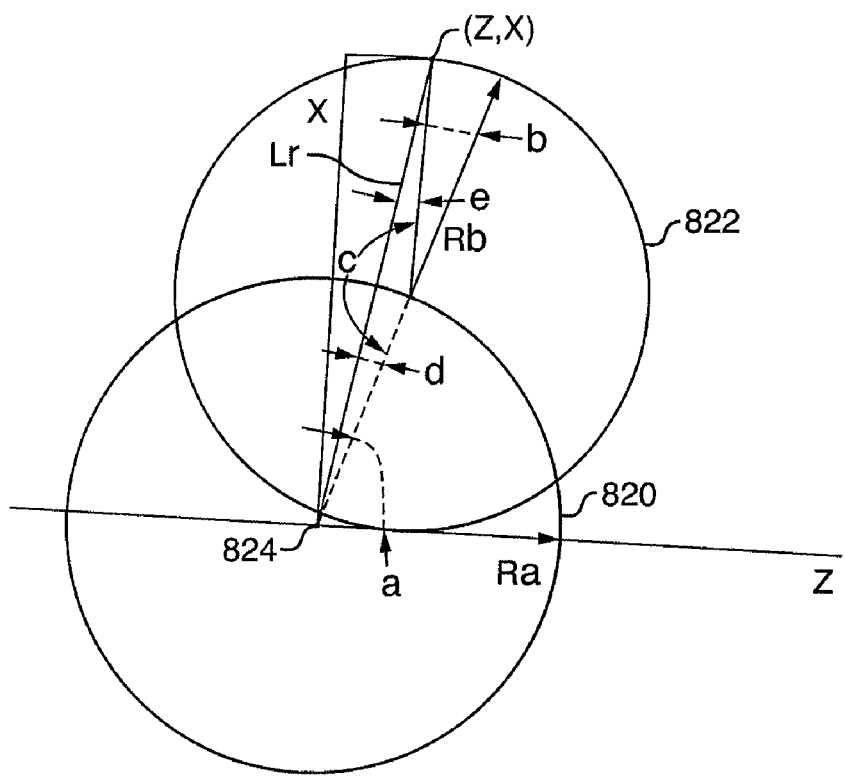

Equation set 2 describes one means of determining the rotations of three bearings that are necessary to move the object from a known position (such as determined by equation set 1), to a new position. The variables are illustrated in FIG. 5B. Equation set 2 might be used to control object position during a desired operation, for example to control the position of a grinding wheel relative to a part being ground during all phases of the grinding operation. Equation set 3 is an alternative to equation set 2; it is expected that other solutions exist.

FIG. 5A illustrates circular area 802 within which the three-bearing system described by the drawing can move an object; this description will reference the structure shown in FIG. 2. Rectangle 808 illustrates the desired Z and X-axis tool motion to be accomplished by the system. Circle 804 with radius Ra delineates the eccentric motion of the center of the second bearing (bearing 14, FIG. 2) about the axis of circle 802, which is the axis of bearing 12. Circle 806 with radius Rb delineates the eccentric motion of the center of the third bearing (bearing 16, FIG. 2) about the axis of circle 804.

Similarly, FIG. 5B illustrates the rotational motions about system center 824 of a system with first eccentric radius Ra defining circle 820, and second eccentric radius Rb defining circle 822.

Equation set 1:

$$z = \cos(a)Ra + \cos(a+b)Rb$$
$$x = \sin(a)Ra + \sin(a+b)Rb$$
$$\theta = -(a+b)$$

where:
$Ra$ = eccentric radius
$Ra$ = eccentric radius
$a$ = angle of rotation of bearing "a" (e.g. bearing 12, Fig.2)
$b$ = angle of rotation of bearing "b" (e.g. bearing 14, Fig.2)
$\theta$ = angle of rotation of bearing "c" (e.g. bearing 16, Fig.2)

Equation set 2:

$$L_r = \sqrt{(x^2 + z^2)}$$
$$s = (R_a + R_b + L_r)/2$$
$$r = \sqrt{\frac{(s-R_b)(s-R_a)(s-L_r)}{s}}$$
$$\tan(c/2) = r/(s-L_r)$$
$$c = 2\,a\sin(r/(r^2 + (s-L_r)^2))$$
$$b = \pi - c$$
$$d = 2\,a\sin(r/(r^2 + (s-Rb)^2))$$
$$x = L_r(\sin(a+d))$$
$$z = L_r(\cos(a+d))$$
$$a = a\sin(x/L_r) - d$$

Equation set 3:

$$z = \frac{\frac{2z_1}{x_1}\left(\frac{z_1^2 + x_1^2}{2x_1}\right) \pm \sqrt{\left(\frac{-2z_1}{x_1}\left(\frac{z_1^2 + x_1^2}{2x_1}\right)\right)^2 - 4\left(1 + \frac{z_1^2}{x_1^2}\right)\left(\left(\frac{z_1^2 + x_1^2}{2x_1}\right)^2 - R^2\right)}}{2\left(1 + \frac{z1^2}{x1^2}\right)}$$

$$x = \frac{-z_1 z}{x_1} + \frac{z_1^2 + x_1^2}{2x_1}$$
$$a = \arg(x, iy)$$
$$b = \arg(x_1 - x, i(y_1 - y)) - a$$
$$\theta = -(a+b)$$

where.
$z_1$, $x_1$, is the desired position
$z$, $x$ are the intersection points of the two circles that define the two eccentric motions of the system
$a$ and $b$ are the required rotations to reach point $z_1$, $x_1$ A study that was undertaken to investigate object travel of at least 8 inches in the Z direction and at least 1.5 inches in the X direction. In the study, the two offsets (eccentric radii) were constrained to be equal, and the object (tool) being positioned by the system was centered on the axis of rotation of the theta bearing. The bearing sizes of three of many possible embodiments that can accomplish this range of motion are set forth in Table 1 below. The design of embodiment A has offsets of 4.000" and can accomplish Z motion of 14.846" and X motion of 5.994". The design of embodiment B has offsets of 2.035" and can accomplish Z motion of 8.000" and X motion of 1.500". The design of embodiment C has offsets of 2.136" and can accomplish Z motion of 8.000" and X motion of 3.000". The design of embodiment B appears to be the most compact design that meets the study motion requirements. The design of embodiment C has only slightly larger mid-size and smallest bearings, yet accomplishes twice the travel in the X axis as compared to the design of embodiment B.

TABLE 1

(dimensions in inches)

| Embodiment | | Large | Mid-size | Theta (small) |
| --- | --- | --- | --- | --- |
| A | ID | 33.750 | 21.250 | 10.000 |
|   | OD | 43.000 | 25.000 | 12.750 |
| B | ID | 31.563 | 18.750 | 10.000 |
|   | OD | 36.000 | 22.250 | 12.750 |
| C | ID | 31.563 | 18.750 | 10.000 |
|   | OD | 36.000 | 22.250 | 12.750 |

Figure 6:
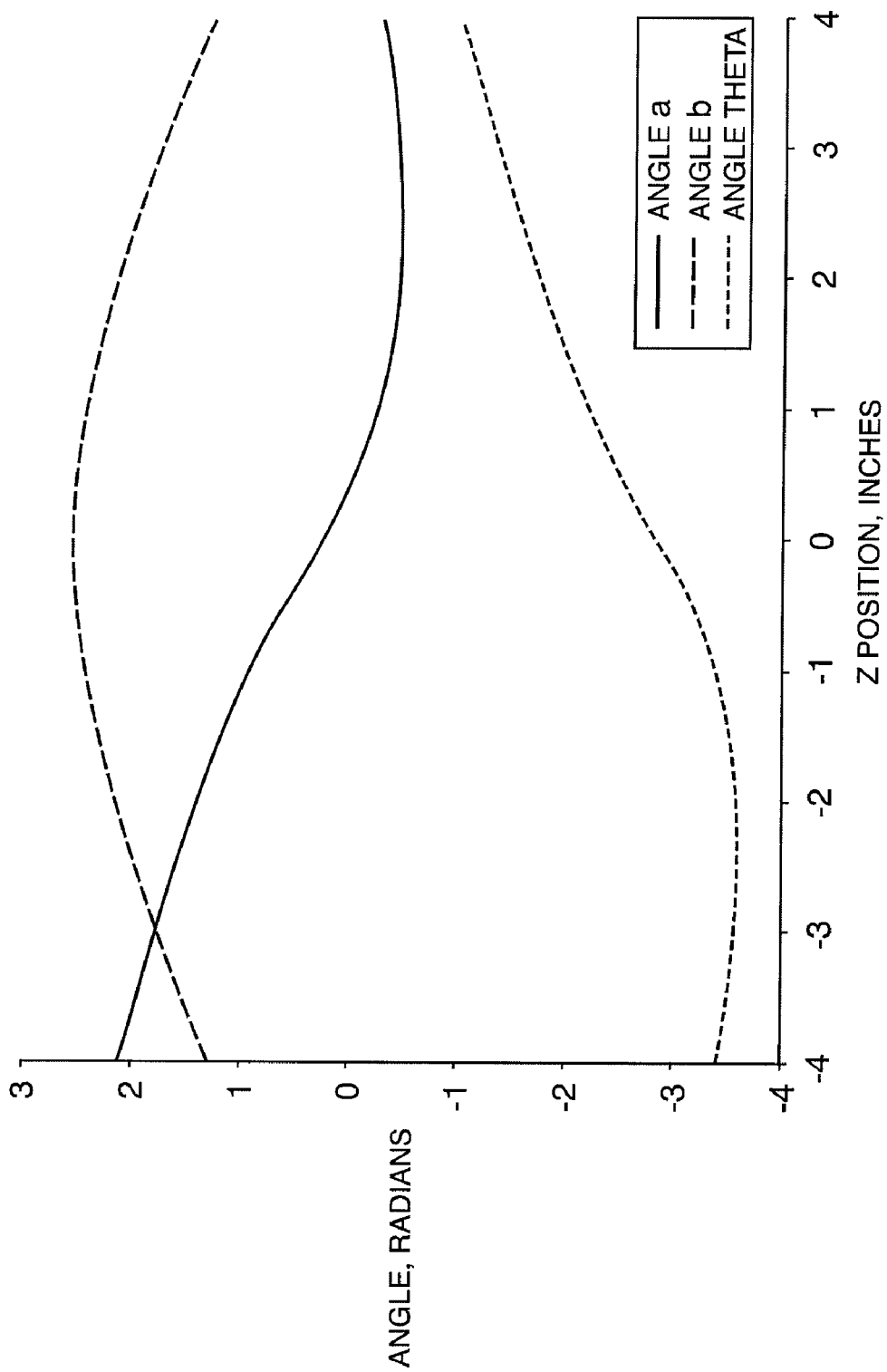
FIGS. 6 and 7 detail the bearing rotation angle versus Z and X positions, respectively, for the three bearings of one specific embodiment of a system of this invention.
Figure 7:
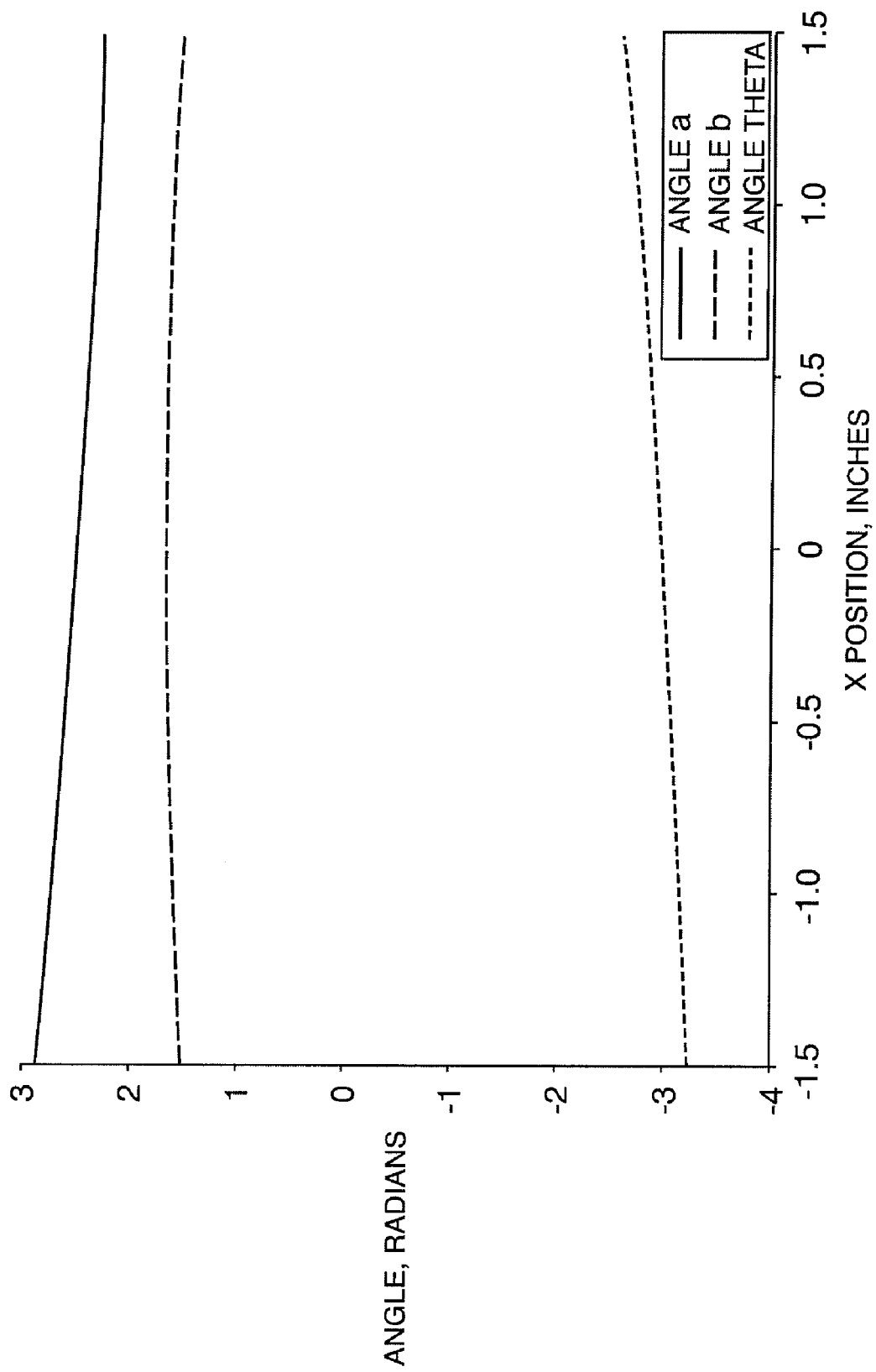

FIGS. 6 and 7 detail the bearing rotation angle versus Z and X positions, respectively, for the three bearings of the design of embodiment C. The data is given for specific, non-limiting designs of embodiments of the invention.

Figure 8:
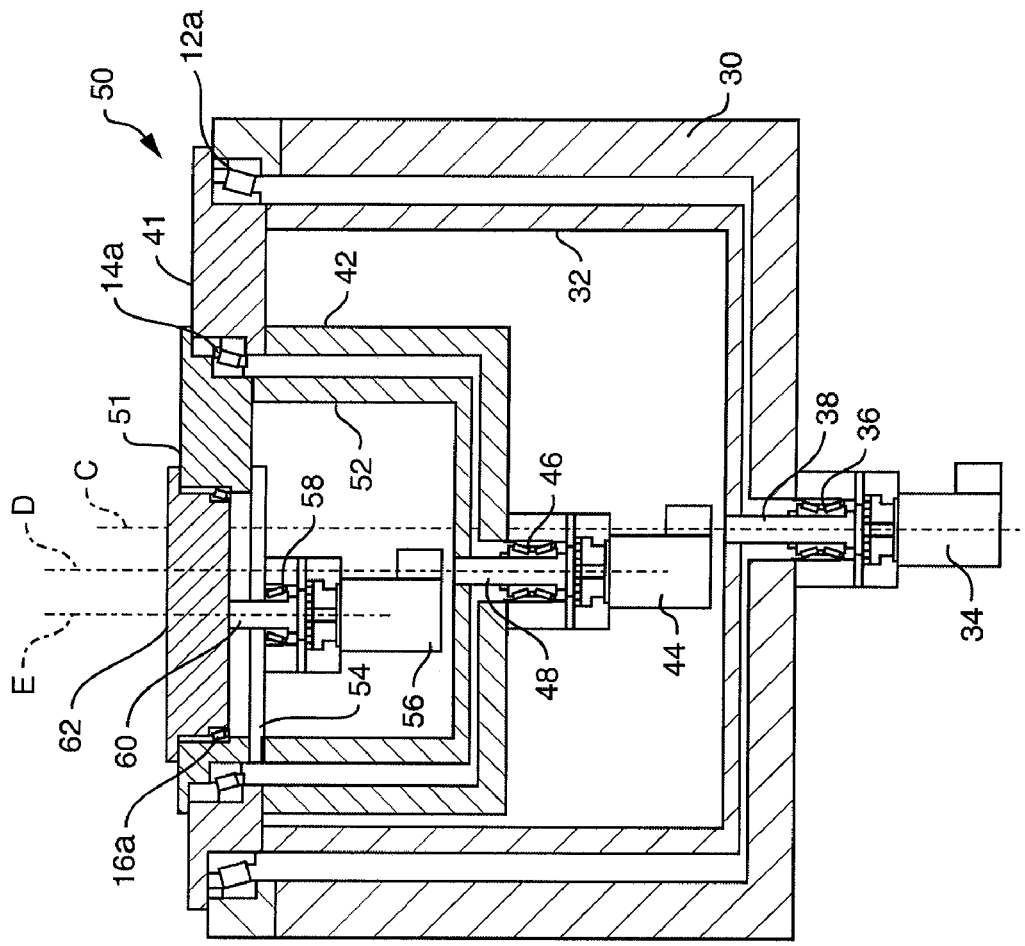
FIG. 8 is a simplified cross-sectional elevational view of a system according to the invention that accomplishes two-axis movement and angular positioning of an object within a plane using three rotations, two of which are eccentric.

FIG. 8 is a simplified cross-sectional elevational view of a system according to the invention that accomplishes the two-axis movement and angular positioning of an object within a plane such as described in accordance with FIG. 2, for example. System 50 is accomplished with three tapered roller bearings 12a, 14a and 16a. Housing 30 supports each of the bearings and the drives for the inner two bearings 14a and 16a. Plug 41 and housing 32 ride on bearing 12a and are rotated together in both directions about axis C by motor 34 that drives output shaft 38 that is coupled to housing 32. Preload bearing pair 36 can be included to help accomplish a desired design stiffness. A harmonic drive or other motion translation system can be located between motor 34 and shaft 38. Direct drive or other speed reduction systems such as a gearbox or belt and pulleys can be used instead of a harmonic drive. A rotary encoder (not shown) measures the rotational position of shaft 38. When motor 34 is rotated, all of the structure within the inner race of bearing 12a is rotated about axis C. This accomplishes eccentric motion of the other two rotary motion assemblies. The motors in all embodiments can be electric motors, hydraulic devices or other known devices that can, directly or indirectly, accomplish rotary motion.

Mid-size bearing 14a and smallest bearing 16a are mounted and driven in essentially identical fashions, to accomplish rotations about axes D and E, respectively. Housing 41 supports bearing 14a. Plug 51 and housing 52 are driven by motor/harmonic drive 44 with preload bearing pair 46 and output shaft 48. Inner bearing 16a is supported by plug 51. Motor/harmonic drive 56 with bearing 58 and output shaft 60 drives structure 62. An object to be positioned can be directly or indirectly coupled to structure 62, which in one example can be a tool holder, or can support a tool holder.

Figure 9A:
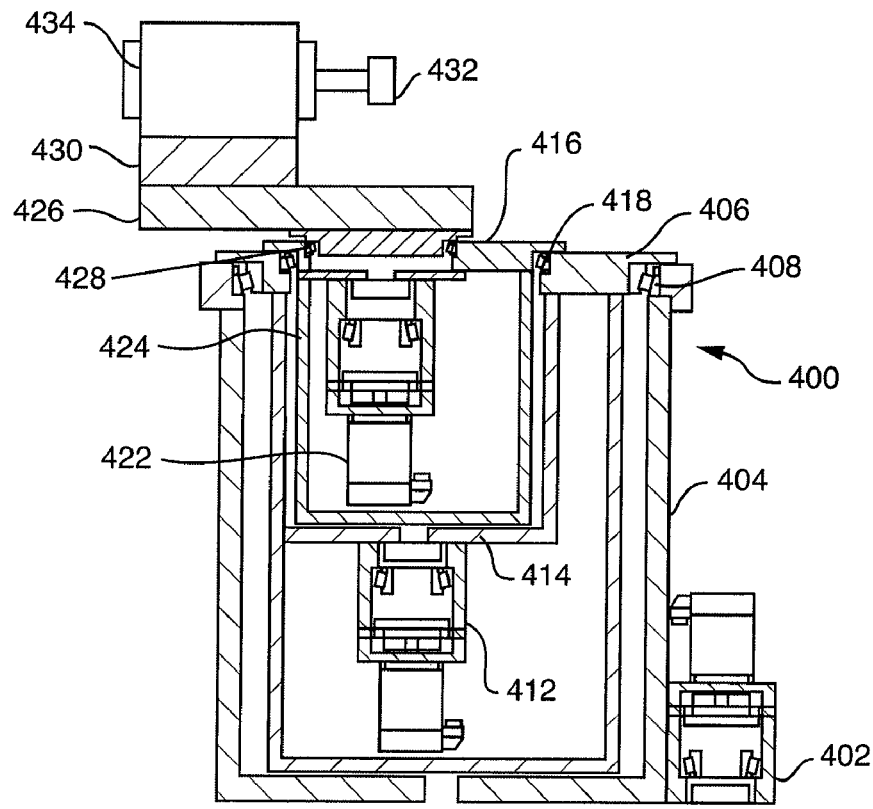
FIGS. 9A and 9B are simplified cross-sectional and top views, respectively of an alternative three-rotation system of the invention.
Figure 9B:
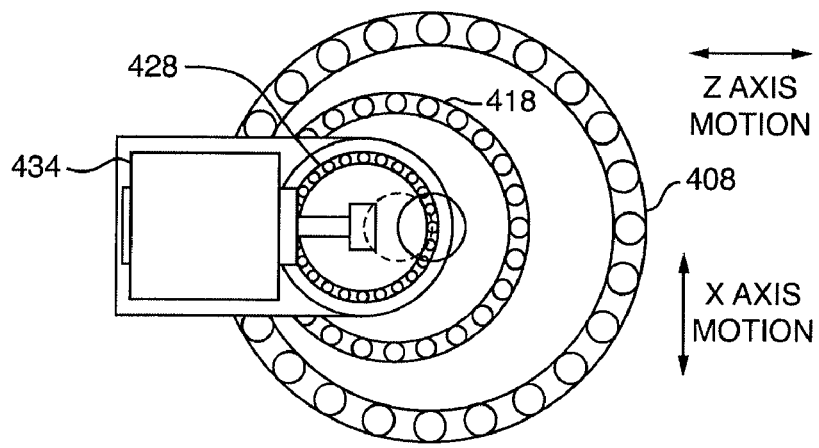

FIGS. 9A and 9B are simplified cross-sectional and top views, respectively of an alternative system 400 of the invention. System 400 illustrates that one or more of the rotary motions can be accomplished by driving a rotatable member at a position that is offset from the center of rotation of the member being driven. In this case, motor 402 is offset from the center of member 401, rather than concentric with it as has been illustrated in the other embodiments. This increases the width of the system but decreases its height. Motor 402 could use any available drive set-up, such as a belt, chain or ring and pinion drive, for example, to rotate member 404, which rotates nested member 406 that rides on bearing 408. Motor 412, which is mounted to member 414, rotates member 424 and member 416 that ride on bearing 418. Motor 422 rotates member 426 that rides on bearing 428. Grinding wheel 432 (which is located on the rotation axis of motor 422) is rotated by motor 434 that is coupled to member 430, which is itself coupled to member 426. System 400 thus accomplishes Z and X-axis movement of grinding wheel 432 within a plane parallel to the surface of member 426, as well as angular positioning of wheel 432 within the plane. System 400 can thus be used to properly position an OD or ID bearing grinder, both for grinding the bearing and dressing the wheel.

Figure 10A:
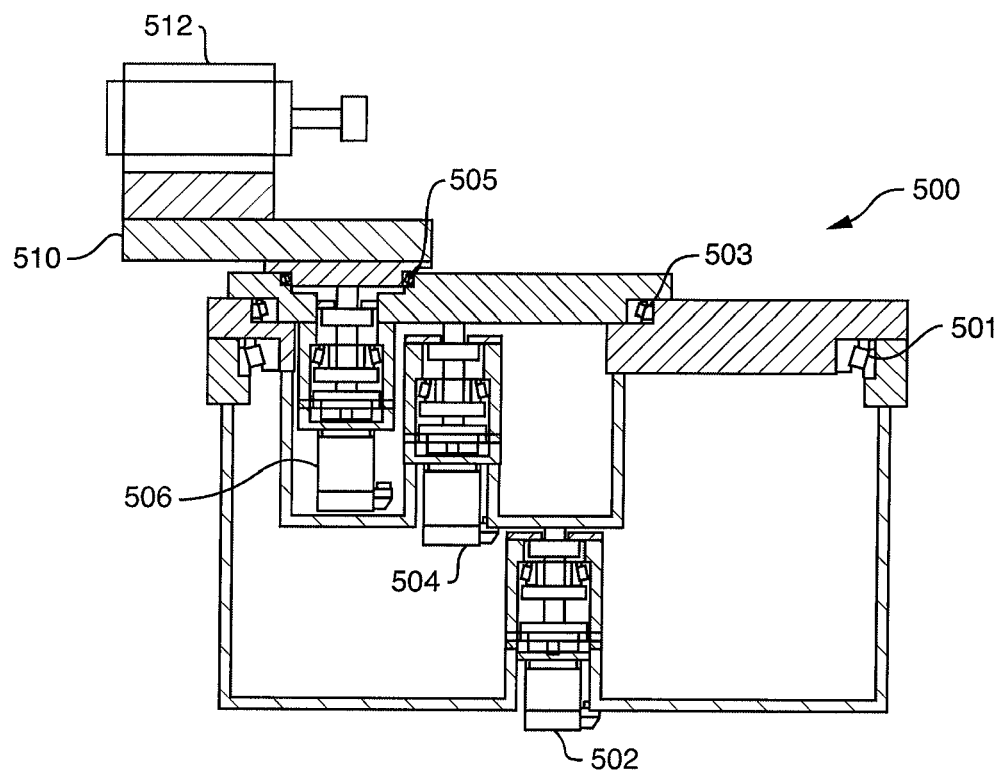
FIGS. 10A and 10B are simplified cross-sectional and top views, respectively of another alternative three-rotation system of the invention.
Figure 10B:
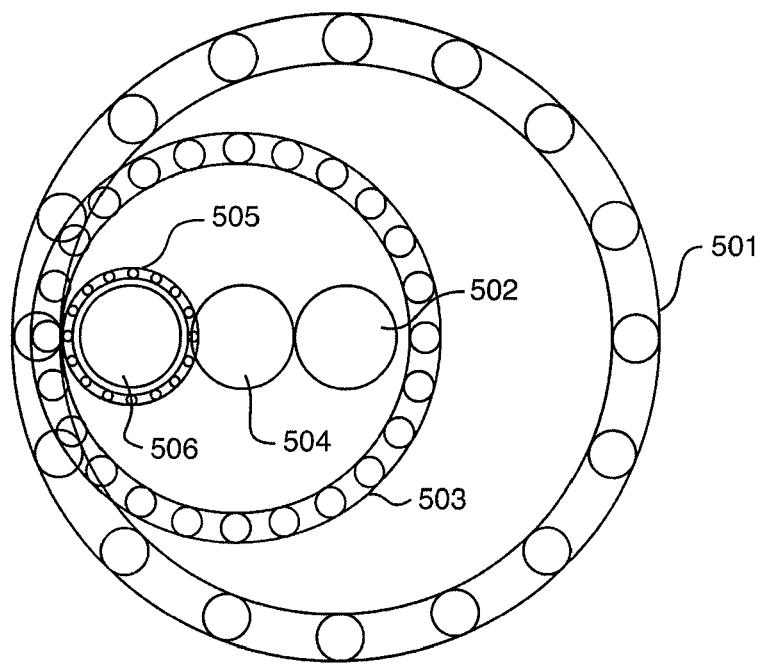

FIGS. 10A and 10B are simplified cross-sectional and top views, respectively of yet another alternative system 500 of the invention. System 500 differs from the systems described above in that motors 504 and 506 are horizontally offset from one another sufficiently such that they do not need to be stacked as in previous embodiments. This decreases the height of the system. Bearings 501, 503 and 505 are shown in FIG. 10B. System 500 accomplishes Z, X and angular positioning of tool 512 in the plane of the tool that is parallel to rotated member 510.

Figure 11:
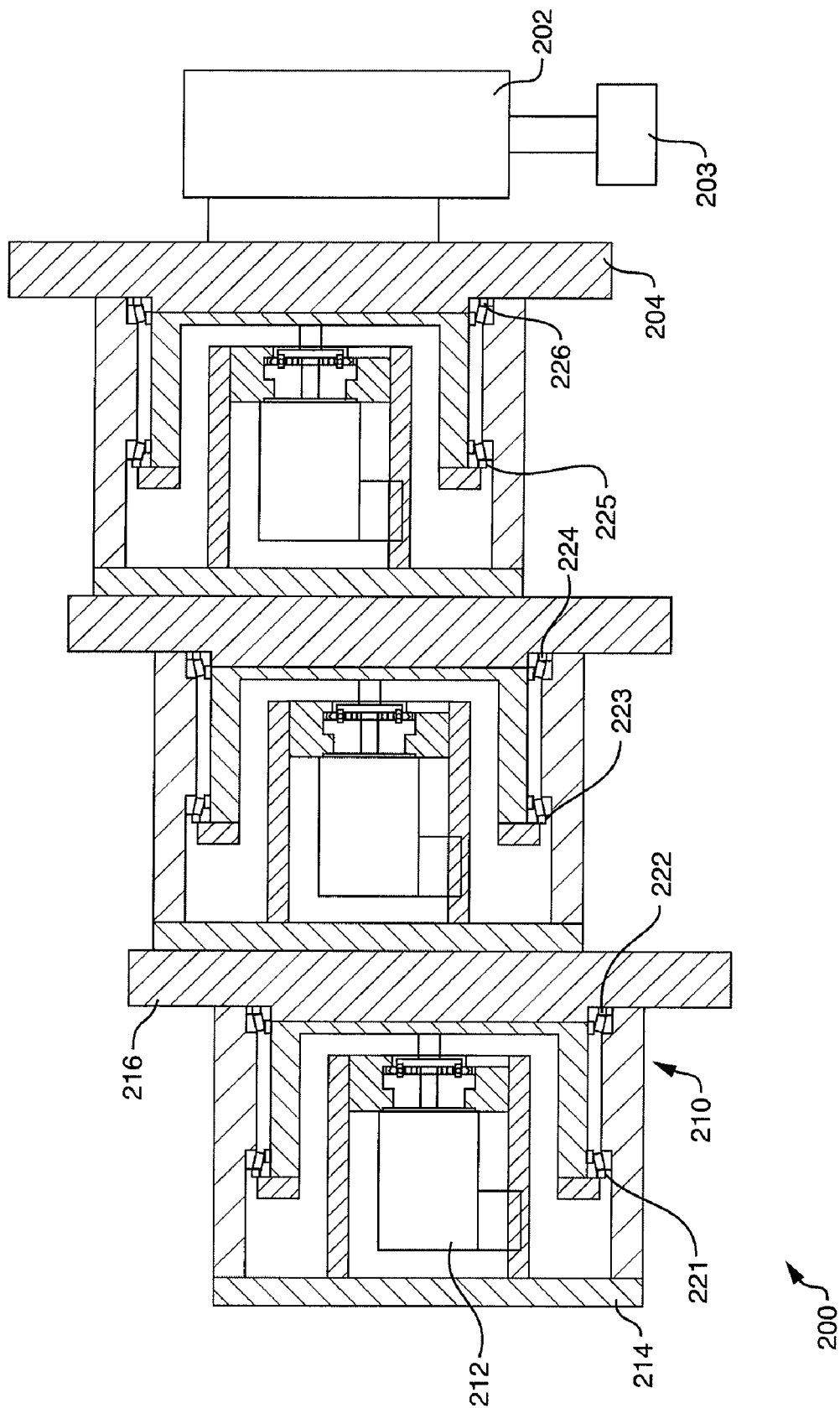
FIG. 11 illustrates another conceptual embodiment of a system of the invention, in which three essentially identical rotary motion assemblies are stacked to accomplish three eccentric rotary motions.

FIG. 11 illustrates another conceptual embodiment of a system 200 of the invention, in which three essentially identical rotary motion assemblies (such as assembly 210) are stacked such that the three rotary motions are eccentric. In this case, bearings 221-226 are not nested one within the other. Assembly 210 comprises fixed portion 214, and drive 212 that rotates movable member 216. Tool 202 is mounted to surface 204. System 200 as a whole accomplishes Z and X motions within the plane in which tool 202 is mounted, as well as angular motion of the working end 203 of tool 202 within that plane.

Figure 12:
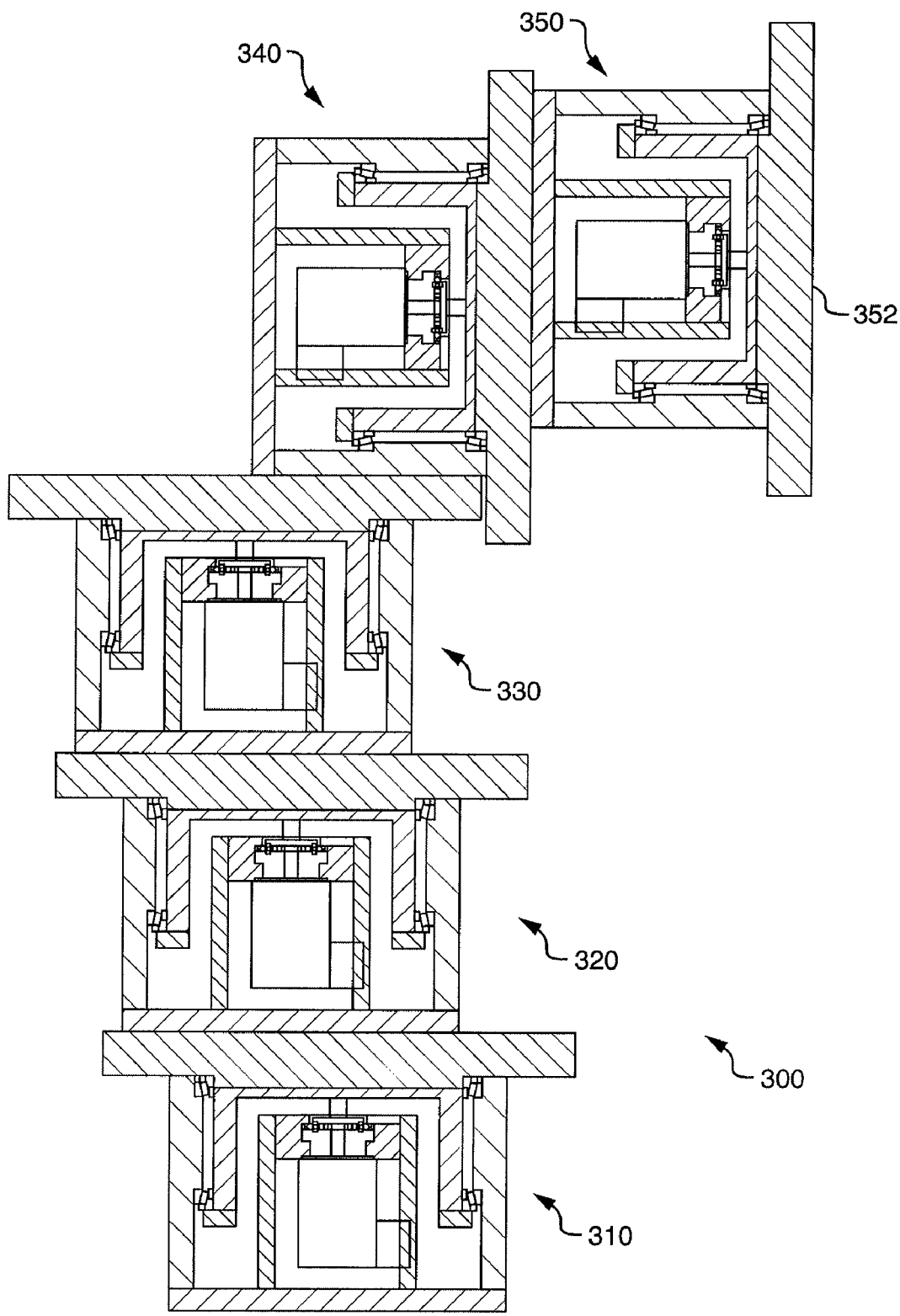
FIG. 12 is another conceptual embodiment of a system of the invention that controls the position in three-dimensional space and rotation about one axis, of an object coupled to the system.

FIG. 12 is another concept of a system 300 that controls the position in three-dimensional space and rotation about one axis of an object coupled to rotated table member 352. System 300 comprises five rotary motion assemblies 310, 320, 330, 340 and 350. Assembly 340 is mounted such that its axis of rotation is orthogonal to the three non-coincident but parallel rotation axes of assemblies 310, 320 and 330. The rotation axis of assembly 350 is parallel to, but not coincident with, that of assembly 340.

Figure 13A:
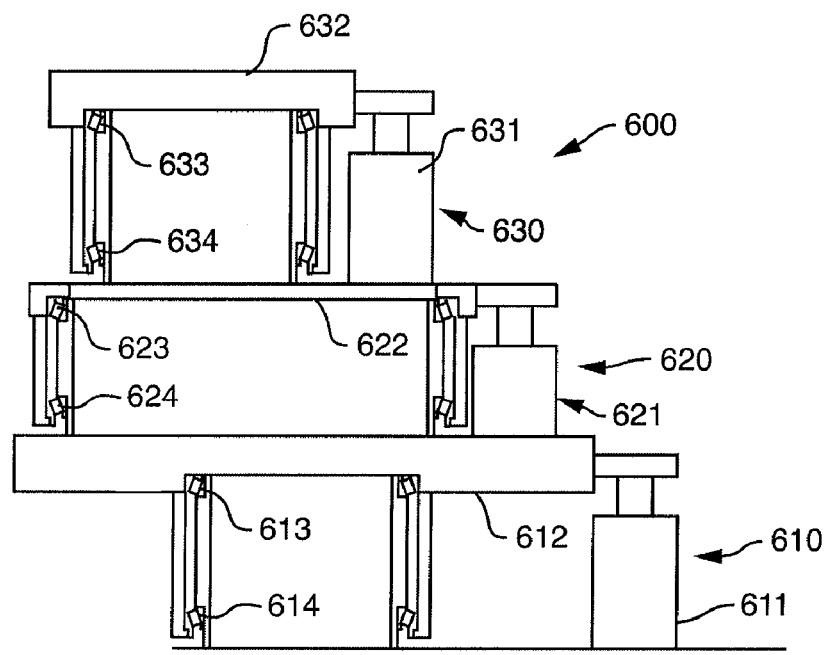
FIGS. 13A and 13B are simplified cross-sectional and top views, respectively of yet another alternative three-rotation system of the invention.
Figure 13B:
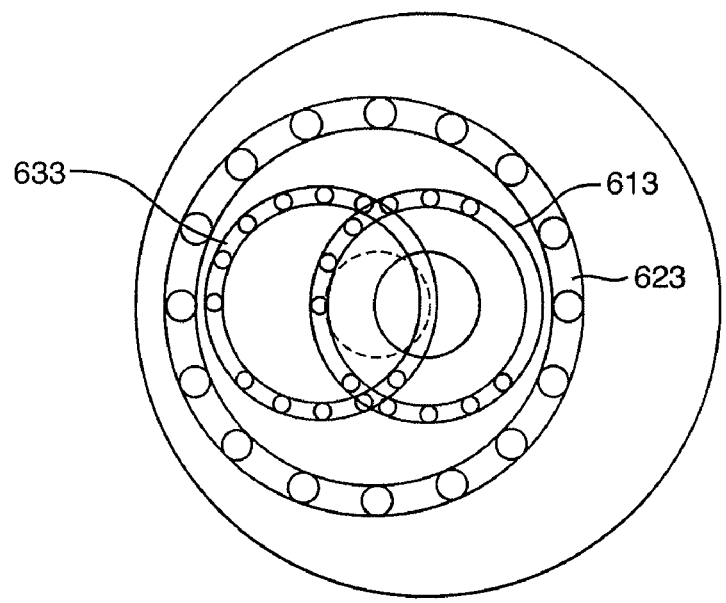

FIGS. 13A and 13B are simplified cross-sectional and top views, respectively of an alternative system 600 of the invention. System 600 illustrates a possibility with all three rotary motions accomplished by driving the rotatable member from the outside rather than the inside. This also illustrated that the bearing sizes need not dictate the extent of motion. Rotatable member 612 is driven by motor 611 and rotates on bearings 613 and 614. Second rotatable member 622 is driven by motor 621 and rotates on bearings 623 and 624. Third rotatable member 632 is driven by motor 631 and rotates on bearings 633 and 634. Obviously, one or more of the rotary motions in the inventive system can be accomplished with internal drives, and/or one or more can be accomplished with external drives as shown in FIG. 13A.

Figure 14:
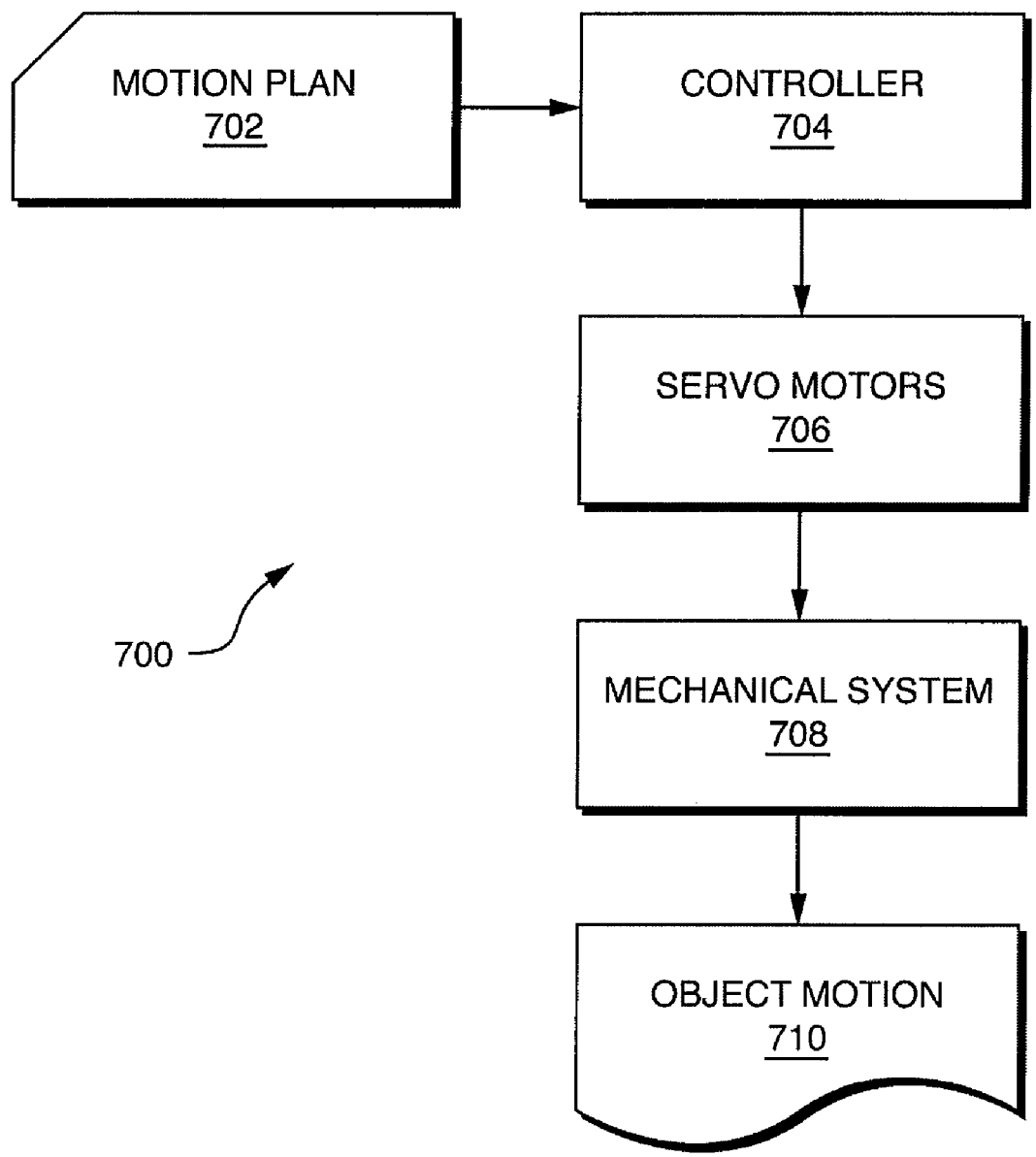
FIG. 14 is a block diagram of a control system for the invention.

FIG. 14 illustrates control system 700 for accomplishing a desired motion of an object coupled (either directly or indirectly) to a movable member of the system. Controller 704 may be a Rockwell Automation Kinetix 6000 (Rockwell Automation, Inc., Milwaukee, Wis.). Motion plan 702 is input to controller 704, either automatically or by an operator. For example, if the system is being used for a repetitive production task such as bearing grinding, the motion plan would be input in advance, and would move the tool from its home position to its working position, and then controlled appropriately during the grinding and finishing processes, and then moved away back to its home position while another bearing was moved into place for grinding. Controller 704 sends appropriate control signals to one, two or all three of servo motors 706, as required to accomplish the motion. These motors interact with mechanical system 708, causing object motion 710.

The invention is applicable to movement of any object, not just grinding tools. For example, industrial robots are used to move tools and parts in an exact, repeatable fashion. This environment is applicable to the inventive system.

Although specific features of the invention are shown in some figures and not others, this is for convenience only, as some features may be combined with any or all of the other features in accordance with the invention.

Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illustrate the invention and does not pose a limitation on the scope of the invention.

A variety of modifications to the embodiments described herein will be apparent to those skilled in the art from the disclosure provided herein. Thus, the invention may be embodied in other specific forms without departing from the spirit or essential attributes thereof.

What is claimed is:

1. A system for moving and positioning an object, comprising:
    a first assembly comprising a first rotatable portion that is rotatable about a first axis;
    a second assembly comprising a second rotatable portion that is rotatable about a second axis that is parallel to but not coincident with the first axis;
    a third assembly comprising a third rotatable portion that is rotatable about a third axis that is parallel to but not coincident with both the first and second axes;
    an object coupled to the third assembly and lying along an object axis that is transverse to each of the first, second and third axes and lies in an object motion plane;
    wherein the assemblies are coupled such that rotation of the first rotatable portion causes eccentric rotation of the second and third rotatable portions about the first axis, and rotation of the second rotatable portion causes eccentric rotation of the third rotatable portion about the second axis, to position the object in the object motion plane;
    wherein rotation of the third rotatable portion causes rotation of the object about a object positioning axis that is orthogonal to the object motion plane, to angularly position the object in the object motion plane; and
    a controller for causing one or each of the first, second and third rotatable portions to rotate, so as to establish a desired position of the object in the object motion plane, and a desired angular position of the object in the object motion plane.

2. The system of claim 1 in which the assemblies each comprise bearings.

3. The system of claim 2 in which the first assembly comprises a first bearing that has a first diameter.

4. The system of claim 3 in which the second assembly comprises a second bearing that has a second diameter.

5. The system of claim 4 in which the first and second bearings have inner races, and the inner race of the second bearing is adapted to rotate about the second axis.

6. The system of claim 5 in which the second axis passes through the area within the circumference of the inner race of the first bearing.

7. The system of claim 5 in which the second axis does not pass through the area within the circumference of the inner race of the first bearing.

8. The system of claim 4 in which the first and second bearings have outer races, and the outer race of the second bearing is adapted to rotate about the second axis.

9. The system of claim 8 in which the second axis passes through the area within the circumference of the outer race of the first bearing.

10. The system of claim 8 in which the second axis does not pass through the area within the circumference of the outer race of the first bearing.

11. The system of claim 1 in which the first and second and third assemblies each comprise a motor.

12. The system of claim 11 in which the first and second assemblies each further comprise a gear reducer or increaser.

13. The system of claim 11 in which the motors define output shafts, and the system further comprises rotary encoders for detecting rotary motion of the motor drive output shafts.

14. The system of claim 1 in which the object comprises a tool.

15. The system of claim 14 in which the object comprises a machine tool.

16. The system of claim 15 in which the machine tool comprises a grinding tool.

17. The system of claim 1 in which the second assembly is coupled to the first rotatable portion of the first assembly.

18. The system of claim 17 in which the controller causes rotation of the first and second rotatable portions so as to produce generally linear movement of the object.

19. The system of claim 1 in which the rotations about the first and second and third axes are each circular rotations.

20. The system of claim 1 wherein the object axis and thus the object motion plane is orthogonal to each of the first, second and third axes.

* * * * *